US008762078B2

(12) United States Patent
Tsukamoto et al.

(10) Patent No.: US 8,762,078 B2
(45) Date of Patent: Jun. 24, 2014

(54) CYLINDER INTAKE AIR AMOUNT CALCULATING APPARATUS FOR INTERNAL COMBUSTION ENGINE

(75) Inventors: Toshinori Tsukamoto, Wako (JP); Naoki Oie, Wako (JP); Todd Robert Luken, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 13/148,058

(22) PCT Filed: Jan. 14, 2010

(86) PCT No.: PCT/JP2010/050359
§ 371 (c)(1), (2), (4) Date: Aug. 5, 2011

(87) PCT Pub. No.: WO2010/095477
PCT Pub. Date: Aug. 26, 2010

(65) Prior Publication Data
US 2011/0295525 A1 Dec. 1, 2011

(30) Foreign Application Priority Data
Feb. 17, 2009 (JP) ................................ 2009-034473

(51) Int. Cl.
*G01F 1/00* (2006.01)

(52) U.S. Cl.
USPC ................................ 702/47; 702/45; 702/50

(58) Field of Classification Search
USPC .................. 702/45, 47, 50; 123/179.16, 391; 73/861, 114.31, 114.32, 114.37
See application file for complete search history.

(56) References Cited

U.S. PATENT DOCUMENTS 6,016,460 A 1/2000 Olin et al.
6,363,903 B1 * 4/2002 Hayashi et al. ............ 123/193.5
6,662,640 B2 * 12/2003 Yagi .......................... 73/114.34
2002/0107630 A1 8/2002 Yagi

FOREIGN PATENT DOCUMENTS

EP 0 559 098 A2 2/1993
EP 1 227 233 A1 7/2002
EP 1 505 283 A1 2/2005

(Continued)

OTHER PUBLICATIONS

Supplementary European Search Report application No. EP10743606 dated Jun. 29, 2012.

(Continued)

*Primary Examiner* — Elias Desta
(74) *Attorney, Agent, or Firm* — Squire Sanders (US) LLP

(57) ABSTRACT

A cylinder intake air amount calculating apparatus for an internal combustion engine for calculating a cylinder intake air amount which is an amount of fresh air sucked into a cylinder of the engine, is provided. An intake air flow rate, which is a flow rate of fresh air passing through an intake air passage of the engine, is obtained, and an intake pressure and an intake air temperature of the engine are detected. A theoretical cylinder intake air amount is calculated based on the intake pressure, the intake air temperature, and a volume of the cylinder. A volumetric efficiency of the engine is calculated by dividing a preceding calculated value of the cylinder intake air amount by the theoretical cylinder intake air amount. The cylinder intake air amount is calculated using the volumetric efficiency, the intake air flow rate, and the preceding calculated value of the cylinder intake air amount.

12 Claims, 9 Drawing Sheets

(56) References Cited

FOREIGN PATENT DOCUMENTS

| | | |
|---|---|---|
| JP | 07-259630 | 10/1995 |
| JP | 2001-003796 | 1/2001 |
| JP | 4120524 | 5/2008 |

OTHER PUBLICATIONS

International Search Report corresponding to International Application No. PCT/JP2010/050359 dated Feb. 16, 2010.

* cited by examiner

CYLINDER INTAKE AIR AMOUNT CALCULATING APPARATUS FOR INTERNAL COMBUSTION ENGINE

TECHNICAL FIELD

The present invention relates to a cylinder intake air amount calculating apparatus for calculating a cylinder intake air amount which is an amount of fresh air sucked in a cylinder of an internal combustion engine.

BACKGROUND ART

Patent Document 1 (shown below) discloses an apparatus for calculating a cylinder intake air amount using an engine rotational speed, an intake pressure, and a charging efficiency (volumetric efficiency). In this apparatus, an air-fuel ratio learned value for correcting changes in the charging efficiency is calculated according to a detected air-fuel ratio, and the cylinder intake air amount is calculated using the charging efficiency corrected with the air-fuel ratio learned value.

Patent Document 2 (shown below) discloses an apparatus for calculating a volumetric efficiency equivalent value which indicates a volumetric efficiency of the engine, and calculating a cylinder intake air amount using a present calculated value and a preceding calculated value of the volumetric efficiency equivalent value, and a detected intake fresh air amount. In this apparatus, the volumetric efficiency equivalent value is calculated according to a coefficient f(Ne) depending on the engine rotational speed, a coefficient G(Regr) depending on the exhaust gas recirculation rate, an intake pressure, and an atmospheric pressure.

PRIOR ART DOCUMENT

Patent Document

Patent Document 1: Japanese Patent Laid-open Publication No. 87-259630

Patent Document 2: Japanese Patent Publication No. 4120524

SUMMARY OF THE INVENTION

Problems to be Solved by the Invention

In the apparatus shown in Patent Document 1, the charging efficiency is calculated by retrieving a map which is set according to the engine rotational speed and the intake pressure. Therefore, the man power for setting the map is necessary. Further, if the engine has a valve actuating mechanism for changing an operating characteristic (a lift amount, a valve opening timing and a valve closing timing) of the intake valve (and the exhaust valve), it is necessary to prepare a plurality of maps corresponding to the operating characteristic of the intake valve (and the exhaust valve), which greatly increases the man power for setting the maps. Further, correction of the map-retrieved value (e.g., the correction with the air-fuel ratio learned value described above) is necessary for coping with other operating conditions which are different from the engine operating condition for which the maps are set.

In the apparatus shown in Patent Document 2, the coefficients f(Ne) and G(Regr) are calculated using previously set tables. Therefore, the apparatus cannot cope with the situation where the table set values become improper due to the aging changes in the engine characteristic (an additional correction is necessary in such situation). Further, calculation of the exhaust gas recirculation rate is necessary, which makes the calculation process more complicated.

The present invention was made contemplating the above-described points, and the objective of the invention is to provide a cylinder intake air amount calculating apparatus which can calculate a cylinder intake air amount without using maps and/or tables, and always obtain an accurate value of the cylinder intake air amount without being affected by the aging changes in the engine characteristic.

To attain the above objective, the present invention provides a cylinder intake air amount calculating apparatus for an internal combustion engine for calculating a cylinder intake air amount (GAIRCYLN) which is an amount of fresh air sucked into a cylinder of the engine. The cylinder intake air amount calculating apparatus is characterized by including intake air flow rate obtaining means for obtaining an intake air flow rate (GAIR, HGAIR) which is a flow rate of fresh air passing through an intake air passage of the engine; intake pressure detecting means for detecting an intake pressure (PBA) of the engine; intake air temperature detecting means for detecting an intake air temperature (TA) which is a temperature of air sucked into the engine; theoretical cylinder intake air amount calculating means for calculating a theoretical cylinder intake air amount (GAIRSTD) based on the intake pressure (PBA) and the intake air temperature (TA); volumetric efficiency calculating means for calculating a volumetric efficiency ($\eta$ v) of the engine by dividing a preceding calculated value (GAIRCYLN(k−1)) of the cylinder intake air amount by the theoretical cylinder intake air amount (GAIRSTD); and cylinder intake air amount calculating means for calculating the cylinder intake air amount (GAIRCYLN) using the volumetric efficiency ($\eta$ v), the intake air flow rate (GAIR, HGAIR), and the preceding calculated value (GAIRCYLN(k−1)) of the cylinder intake air amount.

With this configuration, the theoretical cylinder intake air amount is calculated based on the intake pressure and the intake air temperature, the volumetric efficiency of the engine is calculated by dividing the preceding calculated value of the cylinder intake air amount by the theoretical cylinder intake air amount, and the cylinder intake air amount is calculated using the volumetric efficiency, the intake air flow rate, and the preceding calculated value of the cylinder intake air amount. Therefore, it is possible to calculate the cylinder intake air amount without using any maps or tables. Further, the volumetric efficiency is updated using the detected parameters, which makes it possible to always obtain an accurate value of the cylinder intake air amount without being affected by aging changes in the engine characteristic.

Preferably, the intake air flow rate obtaining means detects the intake air flow rate (GAIR) using an intake air flow rate sensor (13).

With this configuration, the cylinder intake air amount is calculated using the detected intake air flow rate using the intake air flow rate sensor. The intake air flow rate can be estimated using the intake pressure or an opening of the throttle valve. By directly detecting the intake air flow rate with the flow rate sensor, the cylinder intake air amount can be calculated without the estimation error.

Alternatively, the intake air flow rate (HGAIR) may be estimated based on the opening (TH) of the throttle valve of the engine and the intake pressure (PBA).

With this configuration, the cylinder intake air amount is calculated using the intake air flow rate estimated based on the opening of the throttle valve of the engine and the intake pressure. Accordingly, it is not necessary to dispose the intake air flow rate sensor, which can reduce the cost. Further, an accurate value of the cylinder intake air amount can be obtained in the transient operating condition, since the influence of the detection delay is less than that of using the intake air flow rate sensor. Further, by additionally using the intake air flow rate sensor, the detection delay of the intake air flow rate sensor in the transient operation condition can be compensated. In such case, it is possible to detect a failure of the intake air flow rate sensor, which improves the reliability of the intake air flow rate to be applied to the calculation of the cylinder intake air amount.

Preferably, the volumetric efficiency calculating means at least once updates the volumetric efficiency (η v(i)) using the cylinder intake air amount calculated by the cylinder intake air amount calculating means as the preceding calculated value (GAIRCYLN(i−1)), and the cylinder intake air amount calculating means at least once updates the cylinder intake air amount (GAIRCYLN(i)) using the updated volumetric efficiency (η v(i)).

With this configuration, the volumetric efficiency is at least once updated using the cylinder intake air amount calculated by the cylinder intake air amount calculating means as the preceding calculated value, and the cylinder intake air amount is at least once updated using the updated volumetric efficiency. Therefore, accurate values (which are close to the true value) of the volumetric efficiency and the cylinder intake air amount can be obtained in the transient engine operation condition.

Preferably, the volumetric efficiency calculating means and the cylinder intake air amount calculating means respectively update the volumetric efficiency and the cylinder intake air amount by a predetermined number (iMAX) of times.

With this configuration, the update of the volumetric efficiency and the update of the cylinder intake air amount are performed by the predetermined number of times. Accordingly, the time period necessary to perform the update can be made constant.

Alternatively, the volumetric efficiency calculating means and the cylinder intake air amount calculating means respectively update the volumetric efficiency and the cylinder intake air amount until a difference (D η v) between a preceding value and an updated value of the volumetric efficiency reaches a value less than a first predetermined amount (D η VL), or until a difference (DGACN) between a preceding value and an updated value of the cylinder intake air amount reaches a value less than a second predetermined amount (DGACNL).

With this configuration, the update of the volumetric efficiency and the cylinder intake air amount is performed until a difference between the preceding value and the updated value of the volumetric efficiency reaches a value less than the first predetermined amount, or until a difference between the preceding value and the updated value of the cylinder intake air amount reaches a value less than the second predetermined amount. Accordingly, the updating calculation can be terminated at an appropriate timing.

Preferably, the volumetric efficiency calculating means and the cylinder intake air amount calculating means respectively use the theoretical cylinder intake air amount as the preceding calculated value of the cylinder intake air amount, immediately after start of the engine.

The preceding calculated value of the cylinder intake air amount does not exist immediately after the engine start. Therefore, by using the theoretical cylinder intake air amount as the preceding calculated value, an accurate value of the cylinder intake amount can be obtained promptly.

MODE FOR CARRYING OUT THE INVENTION

Preferred embodiments of the present invention will now be described with reference to the drawings.

Figure 1:
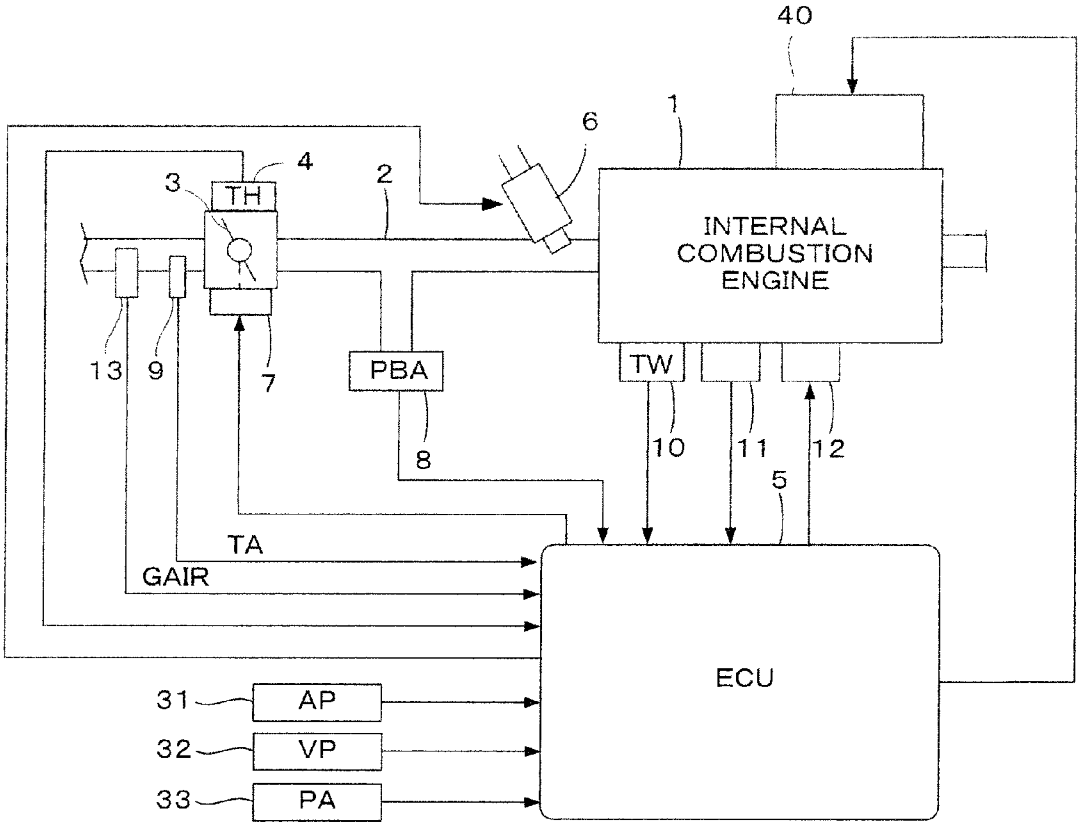
FIG. 1 is a schematic diagram showing a configuration of an internal combustion engine and a control system therefor according to one embodiment of the present invention.

FIG. 1 is a schematic diagram showing a configuration of an internal combustion engine and a control system therefor according to one embodiment of the present invention. In FIG. 1, the internal combustion engine (hereinafter referred to as “engine”) 1 having, for example, four cylinders is provided with a valve operating characteristic varying mechanism 40 which continuously varies an operating phase of intake valves.

The engine 1 has an intake pipe 2 provided with a throttle valve 3. A throttle valve opening sensor 4 for detecting an opening TH of the throttle valve 3 is connected to the throttle valve 3. The throttle valve opening sensor 4 outputs an electrical signal corresponding to the throttle valve opening TH, and supplies the electrical signal to an electronic control unit (referred to as “ECU”) 5. An actuator 7 for actuating the throttle valve 3 is connected to the throttle valve 3, and the operation of the actuator 7 is controlled by the ECU 5.

An intake air flow rate sensor 13 is disposed in the intake pipe 2 for detecting an intake air flow rate GAIR which is a flow rate of air (fresh air) sucked into the engine 1 through the throttle valve 3. Further, an intake air temperature sensor 9 for detecting an intake air temperature TA is disposed upstream of the throttle valve 3. The detection signals of these sensors 13 and 9 are supplied to the ECU 5.

Fuel injection valves 6 are inserted into the intake pipe 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 12 of each cylinder of the engine 1 is connected to the ECU 5. The ECU 5 supplies an ignition signal to each spark plug 15 and controls the ignition timing.

An intake pressure sensor 8 for detecting an intake pressure PBA is disposed downstream of the throttle valve 3. Further, an engine coolant temperature sensor 10 for detecting an engine coolant temperature TW is mounted on the body of the engine 1. The detection signals from these sensors 8 and 10 are supplied to the ECU 5.

A crank angle position sensor 11 is connected to the ECU 5. The crank angle position sensor 11 is provided to detect a rotational angle of a crankshaft (not shown) of the engine 1, and a signal corresponding to the rotational angle detected by the crank angle position sensor 11 is supplied to the ECU 5. The crank angle position sensor 11 includes a cylinder discrimination sensor which outputs a pulse (hereinafter referred to as "CYL pulse") at a predetermined angle position of a specific cylinder of the engine 1. The clank angle position sensor also includes a TDC sensor which outputs a TDC pulse at a crank angle position of a predetermined crank angle before a top dead center (TDC) starting an intake stroke in each cylinder (i.e., at every 180 degrees crank angle in a case of a four-cylinder engine) and a CRK sensor for generating a CRK pulse with a crank angle period (e.g., period of 6 degrees, shorter than the period of generation of the TDC pulse). The CYL pulse, the TDC pulse, and the CRK pulse are supplied to the ECU 5. The CYL pulse, the TDC pulse, and the CRK pulse are used to control various timings, such as the fuel injection timing and the ignition timing, and to detect an engine rotational speed NE.

An accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The engine 1 is provided with an exhaust gas recirculation mechanism (not shown), exhaust gases of the engine 1 are recirculated to the intake pipe 2 on the downstream side of the throttle valve 3.

The ECU 5 includes an input circuit having various functions including a function of shaping the waveforms of the input signals from the various sensors, a function of correcting the voltage level of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the valve operating characteristic varying mechanism 40.

The CPU in the ECU 5 controls an ignition timing, an opening of the throttle valve 3, an amount of fuel to be supplied to the engine 1 (an opening period of each fuel injection valve 6), and an operating phase of the intake valves according to the detection signals from the above-described sensors.

Further, the CPU in the ECU 5 calculates a cylinder intake air amount GAIRCYLN [g/TDC] (an amount of air per TDC period. i.e., a time period during which the crankshaft of the engine 1 rotates 180 degrees), based on the intake air flow rate GAIR, the intake pressure PRA, and the intake air temperature TA which are detected. The calculated cylinder intake air amount GAIRCYLN is used for controlling the fuel supply amount and the ignition timing.

Figure 2:
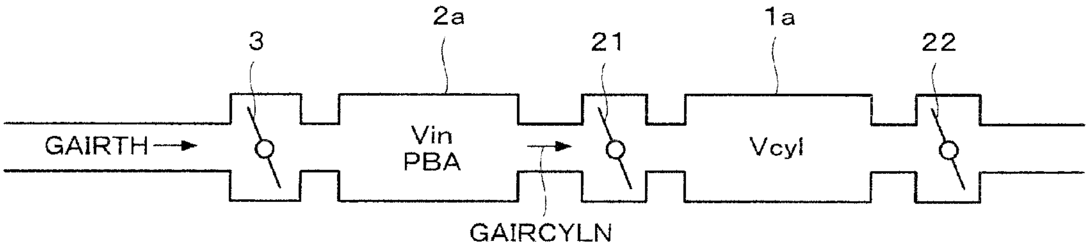
FIG. 2 is a schematic diagram of the engine shown in FIG. 1.

FIG. 2 shows a schematic diagram of the engine 1. In FIG. 2, an intake valve 21, an exhaust valve 22, and a cylinder 1*a* are shown. A change amount DGAIRIN indicative of a change in the air amount in the portion 2*a* of the intake pipe 2 downstream of the throttle valve, is given by the following equation (1). In the equation (1). Vin is a volume of the portion 2*a* downstream of the throttle valve, TALK is an absolute temperature converted from the intake air temperature TA, R is the gas constant, and DPA is a change amount (PBA(k)-PBA(k−1)) of the intake pressure PRA. Further, "k" is a discrete time digitized with the TDC period.

$$DGAIRIN=Vin\times DPBA/(R\times TAK) \quad (1)$$

Accordingly, a difference between an throttle valve passing air flow rate GAIRTH [g/TDC] and the cylinder intake air amount GAIRCYLN [g/TDC] is equal to the change amount DGAIRIN as shown by the following equation (2). The throttle valve passing air flow rate GAIRTH is a flow rate of fresh air passing through the throttle valve (intake air flow rate).

$$DGAIRIN=GAIRTH(k)-GAIRCYLN(k-1) \quad (2)$$

On the other hand, the cylinder intake air amount GAIRCYLN is given by the following equation (3). In the equation (3). Vcyl is a cylinder volume, and η v is a volumetric efficiency.

$$GAIRCYLN=Vcyl\times\eta v\times PBA/(R\times TAK) \quad (3)$$

By using the equation (3), the intake pressure change amount DPBA is given by the following equation (4). Further, by applying the DPBA given by the equation (4) and the relationship of the equation (2) to the equation (1), the following equation (5) is obtained.

[Eq. 1]

$$DPBA = PBA(k) - PBA(k-1) = \frac{(GAIRCYLN(k) - GAIRCYLN(k-1))\times R\times TAK}{Vcyl\times\eta v} \quad (4)$$

$$GAIRCYLN(k) = \left(1 - \frac{Vcyl\times\eta v}{Vin}\right)\times GAIRCYLN(k-1) + \frac{Vcyl\times\eta v}{Vin}\times GAIRTH(k) \quad (5)$$

Accordingly, the equation (5) is shown by the following equation (5a) using a delay coefficient CGAIRCYLN defined by the following equation (6). That is, the cylinder intake air amount GAMMA can be calculated using the first-order delay model equation whose input is the throttle valve passing air flow rate GAIRTH.

$$CGAIRCYLN=Vcyl\times\eta v/Vin \quad (6)$$

$$GAIRCYLN(k)=(1-CGAIRCYLN)\times GAIRCYLN(k-1)+CGAIRCYLN\times GAIRTH(k) \quad (5a)$$

Figure 3:
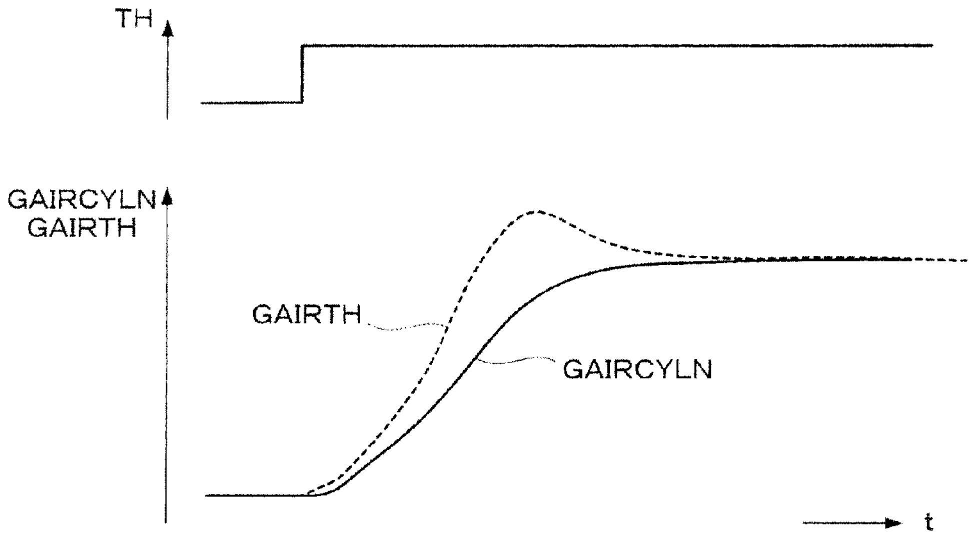
FIG. 3 shows time charts indicating changes in a throttle valve passing air flow rate (GAIRTH) and a cylinder intake air amount (GAIRCYLN) when the throttle vale is opened.

FIG. 3 shows changes in the throttle valve passing air flow rate GAIRTH (dotted line) and the cylinder intake air amount GAIRCYLN (solid line) when the throttle valve is rapidly opened. It is confirmed that the cylinder intake air amount GAIRCYLN can be approximated by the equation (5a).

In order to calculate the delay coefficient CGAIRCYLN with the equation (6), it is necessary to calculate the volumetric efficiency η v. The volumetric efficiency η v changes depending on the engine operating condition (the engine rotational speed NE, the intake pressure PBA), the operating phase of the intake valve, the exhaust gas recirculation rate, and the like. If calculating the volumetric efficiency η v with the method shown in the above-described patent document 2, there are problems such that the influence of aging changes in the engine characteristic cannot be eliminated, or the calculation process becomes complicated.

Therefore, in the present embodiment, the volumetric efficiency η v used in calculation of the cylinder intake air amount GAIRCYLN is calculated by the following equation (7).

$$\eta v = GAIRCYLN(k-1)/GAIRSTD(k) \tag{7}$$

GAIRSTD(k) in the equation (7) is a theoretical cylinder intake air amount calculated by the following equation (8).

$$GAIRSTD(k) = PBA(k) \times Vcyl/(R \times TAK) \tag{8}$$

By using the equation (7), it is possible to calculate the volumetric efficiency η v without using maps or tables, and to obtain an optimum value without the influence of aging changes in the engine characteristic since the volumetric efficiency η v is always updated.

Figure 4:
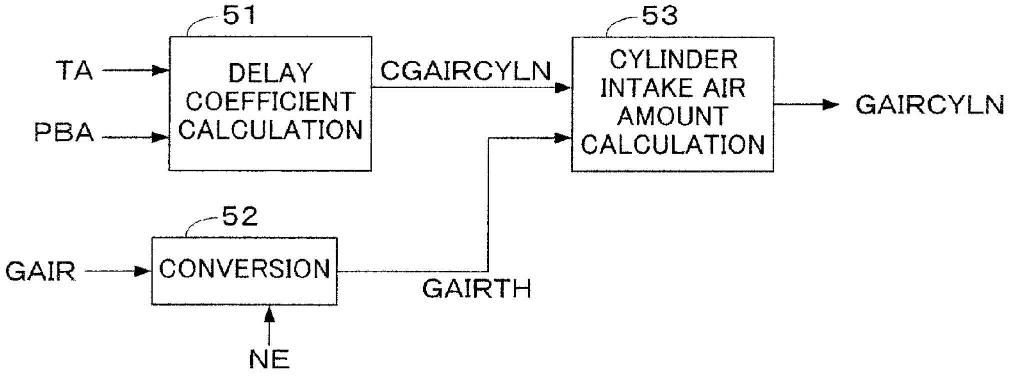
FIG. 4 is a block diagram showing a configuration of a module for calculating the cylinder intake air amount (GAIRCYLN) (first embodiment).

FIG. 4 is a block diagram showing a configuration of a cylinder intake air amount calculation module for calculating the cylinder intake air amount GAIRCYLN with the method described above. The function of this module is embodied by the calculation process of the CPU in the ECU 5.

The cylinder intake air amount calculation module shown in FIG. 4 includes a delay coefficient calculation block 51, a conversion block 52, and a cylinder intake air amount calculation block 53.

The delay coefficient calculation block 51 calculates the delay coefficient CGAIRCYLN using the equations (6)-(8) described above. The conversion block 52 applies the detected intake air flow rate GAIR [g/sec] and the engine rotational speed NE to the following equation (9) to calculate the throttle valve passing air flow rate GAIRTH [g/TDC] which is an intake air amount per TDC period. KCV in the equation (9) is a conversion coefficient.

$$GAIRTH = GAIR \times KCV/NE \tag{9}$$

The cylinder intake air amount calculation block calculates the cylinder intake air amount GAIRCYLN using the above-described equation (5a).

The equation (5a) is a recursive equation, and the equation (7) for calculating the volumetric efficiency η v uses a preceding calculated value of the cylinder intake air amount GAIRCYLN. Therefore, it is necessary to set an initial value GAIRCYLNINI of the cylinder intake air amount GAIRCYLN. In this embodiment, the initial value GAIRCYLNINI is set with the following equation (10) to the theoretical cylinder intake air amount GAIRSTD. Accordingly, the initial value of the volumetric efficiency η v is equal to "1" (equation (7)).

$$\begin{aligned} GAIRCYLNINI &= GAIRSTD \\ &= PBA \times Vcyl/(R \times TAK) \end{aligned} \tag{10}$$

As described above, in this embodiment, the theoretical cylinder intake air amount GAIRSTD is calculated based on the intake pressure PBA, the intake air temperature TA, and the cylinder volume Vcyl, the volumetric efficiency η v is calculated by dividing the preceding calculated value GAIRCYLN(k−1) of the cylinder intake air amount by the theoretical cylinder intake air amount GAIRSTD, and the cylinder intake air amount GAIRCYLN(k) is calculated using the volumetric efficiency η v, the throttle salve passing air flow rate GAIRTH, and the preceding calculated value GAIRCYLN(k−1) of the cylinder intake air amount. Therefore the cylinder intake air amount GAIRCYLN can be calculated without using maps or tables. In addition, an accurate value of the cylinder intake air amount GAIRCYLN is always obtained without being influenced by aging changes in the engine characteristic, since the volumetric efficiency v is updated using the equation (7).

In this embodiment, the intake air flow rate sensor 13 corresponds to the intake air flow rate obtaining means, and the intake pressure sensor 8 and the intake air temperature sensor 9 correspond respectively to the intake pressure detecting means and the intake air temperature detecting means. Further, the ECU5 constitutes the theoretical cylinder intake air amount calculating means, the volumetric efficiency calculating means, and the cylinder intake-air-amount calculation means.

Second Embodiment

Figure 5:
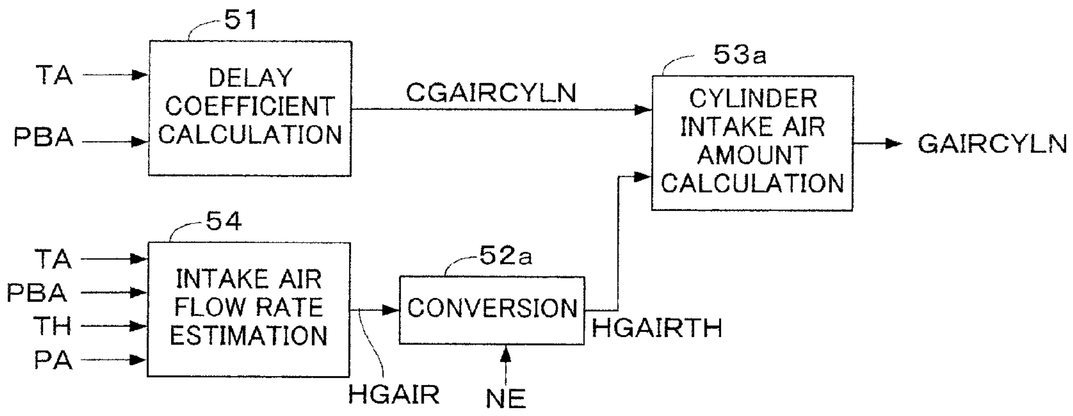
FIG. 5 is a block diagram showing a configuration of a module for calculating the cylinder intake air amount (GAIRCYLN) (second embodiment).

This embodiment is obtained by replacing the cylinder intake air amount calculation module shown in FIG. 3 with the cylinder intake air amount calculation module shown in FIG. 5. This embodiment is the same as the first embodiment except for the points described below.

The cylinder intake air amount calculation module of FIG. 5 is obtained by adding the intake air flow rate estimation block 54 to the module of FIG. 3, and changing the conversion block 52 and the cylinder intake air amount calculation block 53 respectively to a conversion block 52*a* and a cylinder intake air amount calculation block 53*a*.

Figure 6:
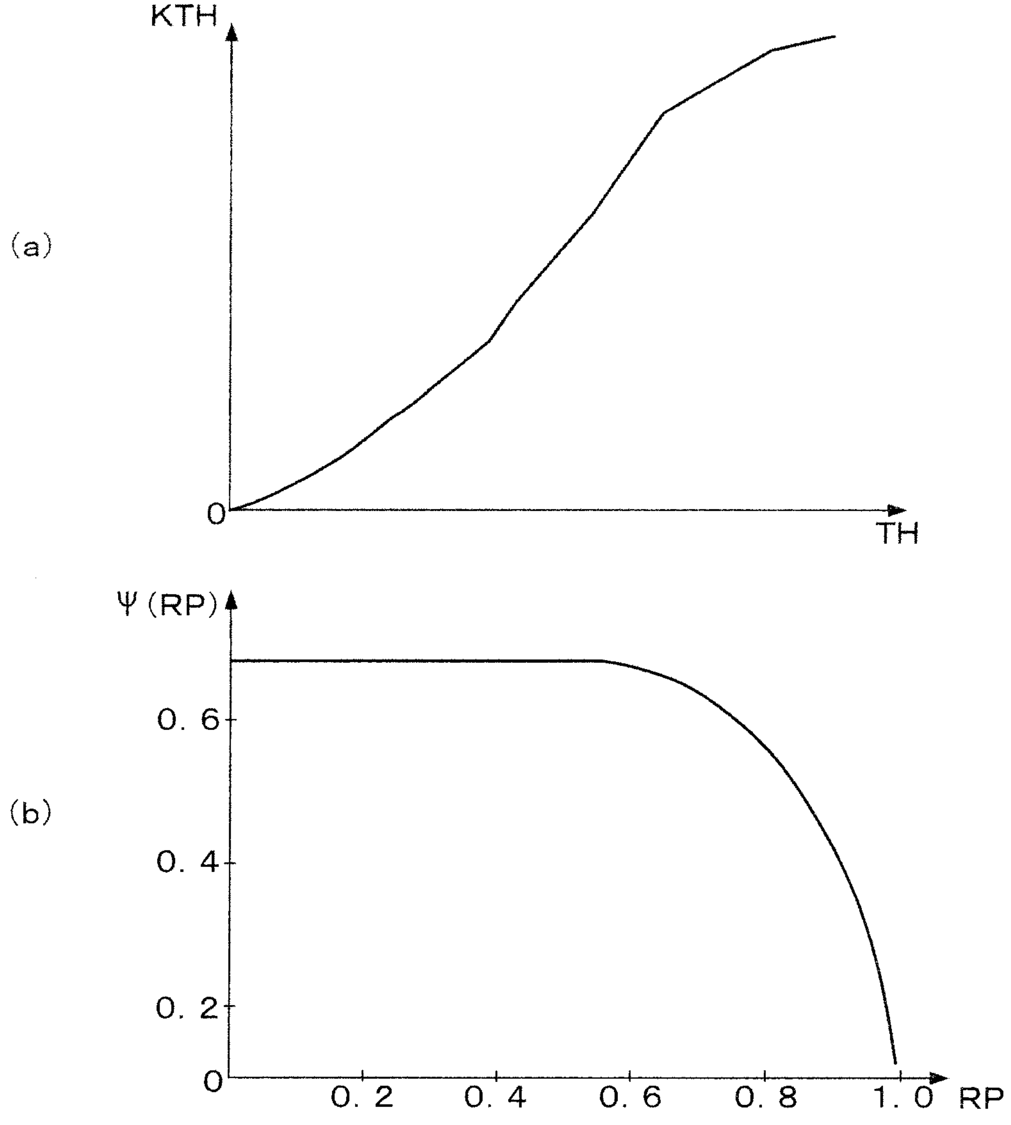
FIG. 6 shows tables used for calculating an estimated intake air flow rate (HGAIR).

The intake air flow rate estimation block 54 calculates, with the following equation (11), an estimated intake air flow rate HGAIR which is an estimated value of the intake air flow rate GAIR, according to the intake air temperature TA, the intake pressure PBA, the throttle valve opening TH, and the atmospheric pressure PA. In the equation (11), KC is a conversion constant for making the dimension of the flow rate to [g/sec]; KTH(TH) is an open area flow rate function calculated according to the throttle valve opening TH; Ψ (RP) is a pressure ratio flow rate function calculated according to a ratio RP (=PBA/PA) of the intake pressure PBA indicative of a pressure on the downstream side of the throttle valve 3, with respect to the atmospheric pressure PA indicative of a pressure on the upstream side of the throttle valve 3; and R is the gas constant. A value of the opening area flow rate function KTH (TN) is calculated using a KTH table shown in FIG. 6(*a*) which is previously set with experiment. The pressure ratio flow rate function Ψ is given by the following equation (12). In the equation (12). "κ" is the specific heat of air. It is to be noted that the pressure ratio flow rate function Ψ takes a local maximum value regardless of the pressure ratio if the air flow rate exceeds the acoustic velocity. Accordingly, in the actual calculation process, the value of the pressure ratio flow rate function Ψ (RP) is also calculated using a Ψ (RP) table (FIG. 6 (*b*)) which is previously set.

[Eq. 2]

$$HGAIR = \frac{KC \times PA \times KTH(TH) \times \psi(RP)}{\sqrt{R \times (273 + TA)}} \quad (11)$$

$$\psi(RP) = \sqrt{\frac{2\kappa}{\kappa - 1}\left\{RP^{\frac{2}{\kappa}} - \left(\frac{1}{RP}\right)^{\frac{\kappa+1}{\kappa}}\right\}} \quad (12)$$

The conversion block 52*a* applies the estimated intake air flow rate HGAIR [g/sec] and the engine rotational speed NE to the following equation (9a), to calculate the estimated throttle valve passing air flow rate HGAIRTH [g/TDC].

$$HGAIRTH = HGAIR \times KCV/NE \quad (9a)$$

The cylinder intake air amount calculation block 53*a* calculates the cylinder intake air amount GAIRCYLN using the following equation (5b).

$$GAIRCYLN(k) = (1 - CGAIRCYLN) \times GAIRCYLN(k-1) + CGAIRCYLN \times HGAIRTH(k) \quad (5b)$$

According to this embodiment, the estimated intake air flow rate HGAIR is calculated based on the throttle valve opening TH and the intake pressure PBA, and the cylinder intake air amount GAIRCYLN is calculated using the estimated intake air flow rate HGAIR. Accordingly, it is not necessary to dispose the intake air flow rate sensor, which can reduce the cost. Further, an accurate value of the cylinder intake air amount GAIRCYLN can be obtained in the transient operating condition, since the influence of the detection delay is less than that of using the intake air flow rate sensor 13. Further, by additionally using the intake air flow rate sensor 13, the detection delay of the intake air flow rate sensor 13 in the transient operation condition can be compensated. In such case, it is possible to detect a failure of the intake air flow rate sensor 13, which improves reliability of the intake air flow rate applied to the calculation of the cylinder intake air amount GAIRCYLN.

Further, in the steady engine operating condition, a difference between the intake air flow rate GAIRTH detected by the intake air flow rate sensor 13 and the estimated intake air flow rate HGAIR is calculated as an estimation error DGAIRE, and the opening area flow rate function KTH applied to the calculation in the estimated intake air flow rate calculation block 54 may be modified so that the estimation error DGARIE becomes "0". With this modification, the estimated intake air flow rate HGAIR can be calculated more accurately.

In this embodiment, the intake air flow rate estimation block 54 of FIG. 5 corresponds to the intake air flow rate obtaining means.

Third Embodiment

In this embodiment, the calculation of the volumetric efficiency η v, the delay coefficient CGAIRCYLN, and the cylinder intake air amount GAIRCYLN described in the first embodiment, is performed more than once at discrete time k, thereby obtaining a more accurate value of the cylinder intake air amount GAIRCYLN in the transient operating condition of the engine. This embodiment is the same as the first embodiment except for the points described below.

Figure 7:
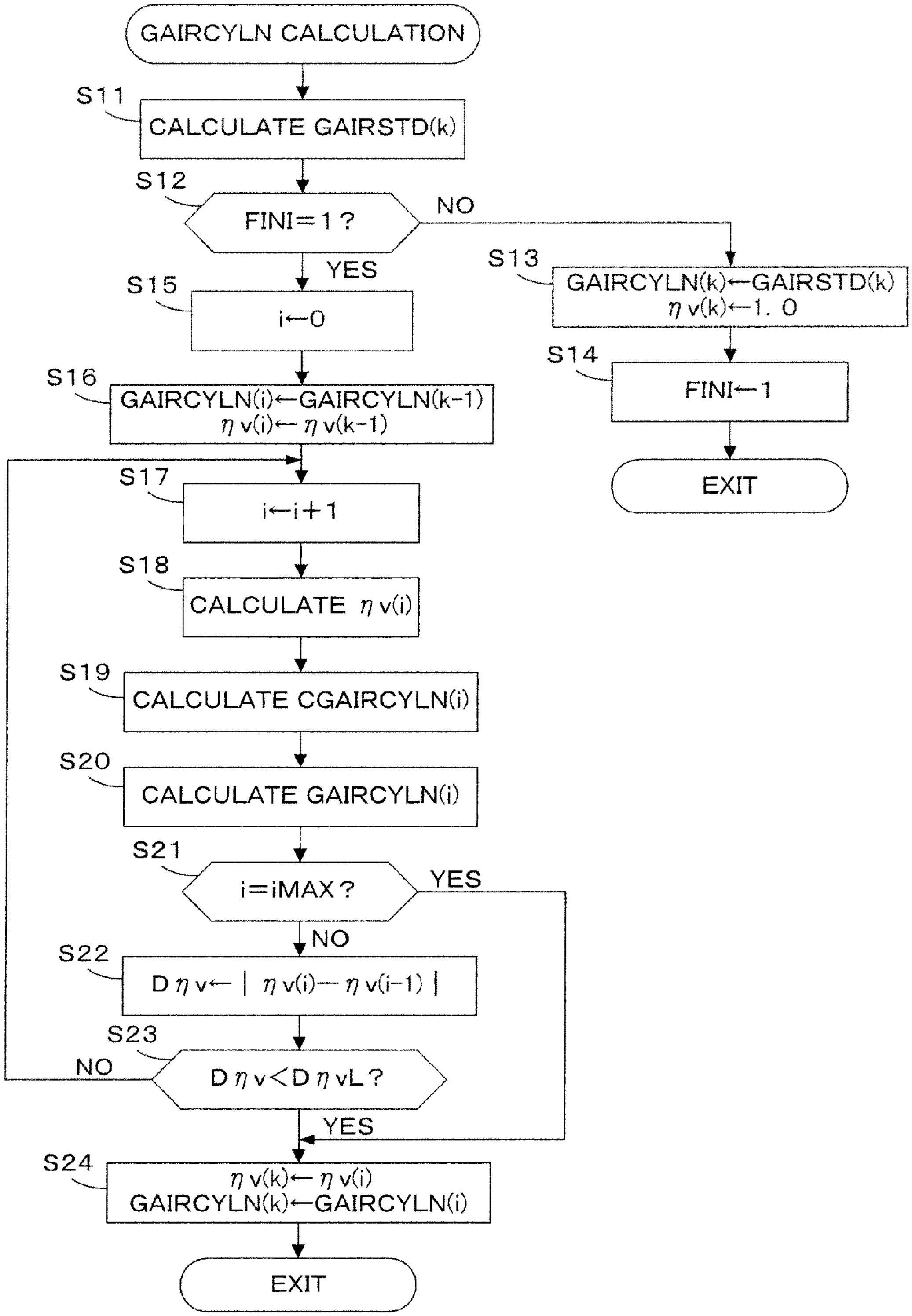
FIG. 7 is a flowchart of a cylinder intake air amount calculating process in a third embodiment of the present invention.

FIG. 7 is a flow chart of the cylinder intake air amount calculation process in this embodiment. This process is executed by the CPU in the ECU5 at every stoke of the engine in synchronism with generation of the TDC pulse (at intervals of 180 degree rotation of the crankshaft if the engine is a 4-cylinder engine).

In step S11, the theoretical cylinder intake air amount GAIRSTD(k) is calculated by the above-described equation (8). In step S12, it is determined whether or not an initialization flag FINI is "1". Since the initialization flag FINI is "0" immediately after start of the engine, the process proceeds to step S13, in which the cylinder intake air amount GAIRCYLN(k) is set to the theoretical cylinder intake air amount GAIRSTD(k), to set the volumetric efficiency η v(k) to "1.0". Subsequently, the initialization flag FINI is set to "1" (step S14).

If the initialization flag FINI is "1", the process proceeds from step S13 to step S15, in which the index parameter i for counting the number of updating calculations is set to "0". In the following description. GAIRCYLN(i), η v(i), and CGAIRCYLN(i) with the index parameter i are respectively referred to as "updated cylinder intake air amount", "updated volumetric efficiency", and "updated delay coefficient".

In step S16, the updated cylinder intake air amount GAIRCYLN(i) (i=0) is set to the preceding value GAIRCYLN(k−1) of the cylinder intake air amount, and the updated volumetric efficiency η v (i)(i=0) is set to the preceding value η v (k−1) of the volumetric efficiency.

In step S17, the index parameter i is increased by "1". In step S18, the updated volumetric efficiency η v(i) is calculated by the following equation (7a).

$$\eta v(i) = GAIRCYLN(i-1)/GAIRSTD(k) \quad (7a)$$

In step S19, the updated delay coefficient CGAIRCYLN(i) is calculated by the following equation (6a).

$$CGAIRCYLN(i) = Vcyl \times \eta v(i)/Vin \quad (6a)$$

In step S20, the updated cylinder intake air amount GAIRCYLN(i) is calculated by the following equation (5c).

$$GAIRCYLN(i) = (1 = CGAIRCYLN(i)) \times GAIRCYLN(i-1) + CGAIRCYLN(i) \times GAIRTH(k) \quad (5c)$$

In step S21, it is determined whether or not the index parameter i has reached the maximum value iMAX. In this embodiment, the maximum value iMAX is set to a value Which is equal to or greater than "2" according to the throughput (computing speed) of the CPU. Since the answer to step S21 is negative (NO) at first, the process proceeds to step S22, in which a volumetric efficiency change amount D η v is calculated by the following equation (21).

$$D\eta v = |\eta v(i) - \eta v(i-1)| \quad (21)$$

In step S23, it is determined whether or not the volumetric efficiency change amount D η v is less than a predetermined threshold value D η vL. If the answer to step S23 is negative (NO), the process returns to step S17, and the calculation of the updated volumetric efficiency η v(i) and the updated cylinder intake air amount GAIRCYLN(i) is again executed by steps S17-S20.

If the answer to step S21 or S23 is affirmative (YES), the process proceeds to step S24, in which the volumetric efficiency η v(k) and the cylinder intake air amount GAIRCYLN (k) at the time are set respectively to the updated volumetric efficiency η v(i) and the updated cylinder intake air amount GAIRCYLN(i) at the time.

Figure 8:
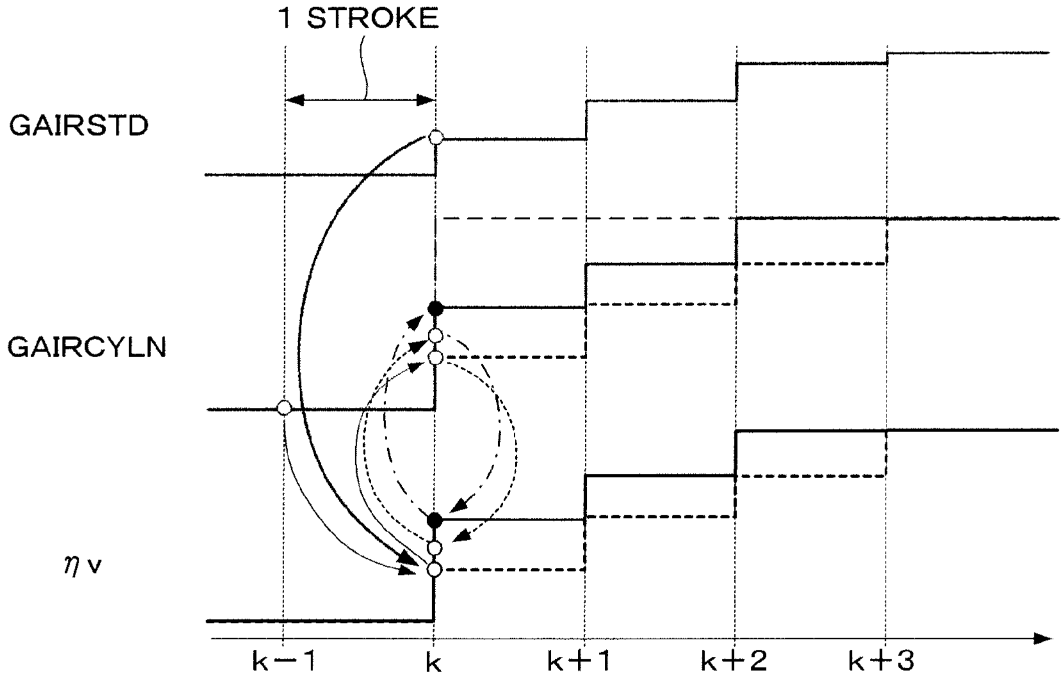
FIG. 8 is a time chart for illustrating the process of FIG. 7.

FIG. 8 is a time chart for explaining the process of FIG. 7. FIG. 8 shows changes in the theoretical cylinder intake air amount GAIRSTD, the cylinder intake air amount GAIRCYLN, and the volumetric efficiency η v in the transient condition where the cylinder intake air amount GAIRCYLN increases. The dashed lines indicating changes in the cylinder intake air amount GAIRCYLN and the volumetric efficiency η v correspond to the calculation method of the first embodiment, and the solid lines correspond to the calculation method of this embodiment.

In the calculation at time k, the thin solid line arrows indicate the calculation of i=1, the dashed line arrows indicate the calculation of i=2, and the chain line arrows indicate the calculation of i=3. In this example, the updating calculation is performed at time k until the index parameter i reaches "3", and the similar updating calculation is also performed at times (k+1) and (k+2) (not shown in FIG. 8). Finally, the cylinder intake air amount GAIRCYLN of the steady state can be obtained at time (k+2). By performing the updating calculation described above, more accurate values of the volumetric efficiency η v and the cylinder intake air amount GAIRCYLN can be obtained in the transient operating condition.

Further, the updating calculation is terminated if the volumetric efficiency change amount D η v becomes less than the predetermined threshold value D η vL even before the index parameter i reaches the upper limit value iMAX. Accordingly, the updating calculation can be terminated at an appropriate timing.

In this embodiment, step S11 of FIG. 7 corresponds to the theoretical cylinder intake air amount calculating means, and steps S12-S24 correspond to the volumetric efficiency calculating means and the cylinder intake air amount calculating means.

[Modification 1]

Figure 9:
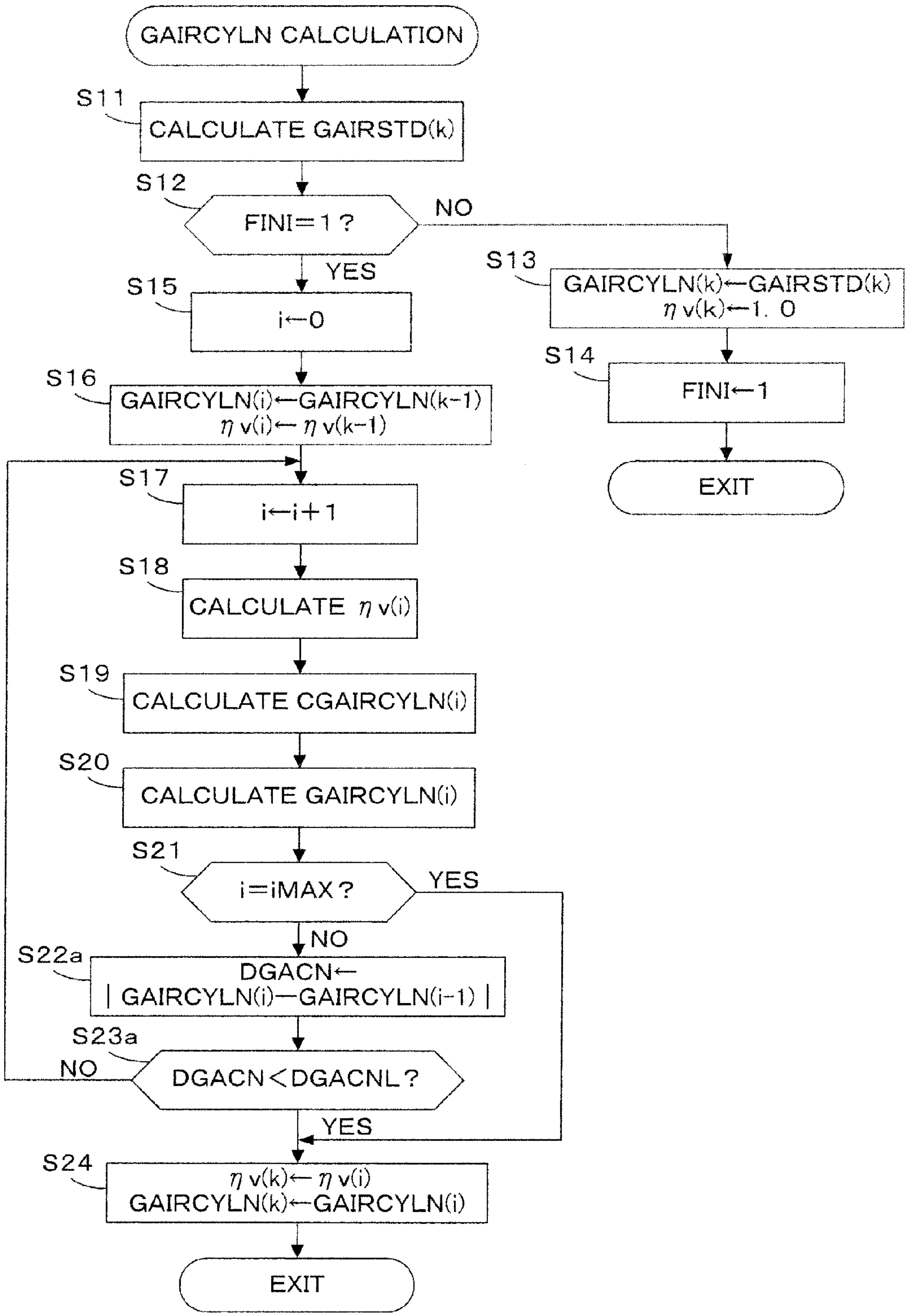
FIG. 9 is a flowchart showing a modification of the process of FIG. 7.

FIG. 9 is a flow chart showing a modification of the process of FIG. 7. The process of FIG. 9 is obtained by changing steps S22 and S23 of FIG. 7 respectively to steps S22*a* and S23*a*. In step S22*a*, a cylinder intake air amount change amount DGACN is calculated by the following equation (22).

$$DGACN=|GAIRCYLN(i)-GAIRCYLN(i-1)| \qquad (22)$$

In step S23*a*, it is determined whether or not the cylinder intake air amount change amount DGACN is less than a predetermined threshold value DGACNL. While the answer to step S23*a* is negative (NO), the process returns to step S17. If the answer to step S23*a* is affirmative (YES), the process proceeds to step S24.

In this modification, the updating calculation ends when the cylinder intake air amount change amount DGACN becomes less than the predetermined threshold value DGACNL even before the index parameter i reaches the maximum value iMAX.

[Modification 2]

Steps S22 and S23 of FIG. 7 may be deleted, and the process may immediately return to step S17 if the answer to step S21 is negative (NO). In this modification, the updating calculation is always performed until the index parameter i reaches the maximum value iMAX.

Fourth Embodiment

This embodiment is obtained by introducing the updating calculation of the third embodiment into the second embodiment.

Figure 10:
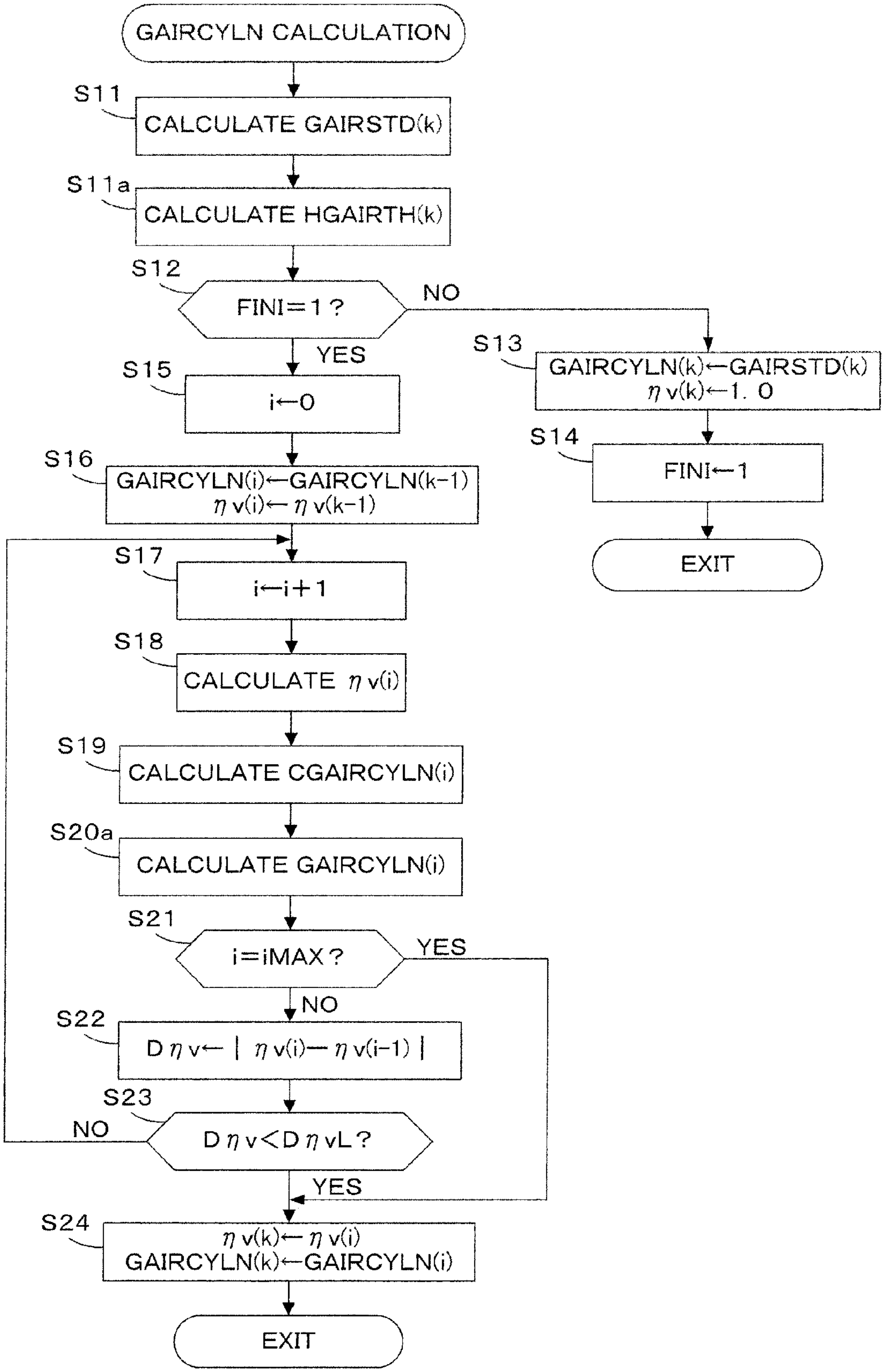
FIG. 10 is a flowchart of a cylinder intake air amount calculating process in a fourth embodiment of the present invention.

FIG. 10 is a flowchart of the cylinder intake air amount calculating process in this embodiment. This flowchart is obtained by adding step S11*a* to the process of FIG. 7, and changing step S20 to step S20*a*.

In step S11*a*, the calculation process in the intake air flow rate estimation block 54 and the conversion block 52*a* of the second embodiment is executed to calculate the estimated throttle valve passing air flow rate HGAIRTH.

In step S20*a*, the updated cylinder intake air amount GAIRCYLN(i) is calculated by the following equation (5d). The equation (5d) is obtained by changing the throttle valve passing air flow rate GAIRTH in the equation (5c) to the estimated throttle valve passing air flow rate HGAIRTH.

$$GAIRCYLN(i)=(1-CGAIRCYLN(i))\times GAIRCYLN(i-1)+GAIRCYLN(i)\times HGAIRTH(k) \qquad (5d)$$

In this embodiment, the estimated intake air flow rate HGAIR is used instead of the detected intake air flow rate GAIR. Therefore, influence of the detection delay of the intake air flow rate becomes less in the transient engine operating condition, as described above. Consequently, a more accurate value of the cylinder intake air amount GAIRCYLN can be obtained, compared with the third embodiment.

Also in this embodiment, steps S22 and S23 may be changed to steps S22*a* and S23*a* like the process of FIG. 9.

In this embodiment, steps S11*a*, S12-S19, S20*a*, and S21-S24 correspond to the volumetric efficiency calculating means and the cylinder intake air amount calculating means.

The present invention is not limited to the embodiments described above, and various modifications may be made. For example, the theoretical cylinder intake air amount GAIRSTD is calculated using the equation (8) in the above-described embodiment. Alternatively, the theoretical cylinder intake air amount GAIRSTD may be calculated with the method described below.

Figure 11:
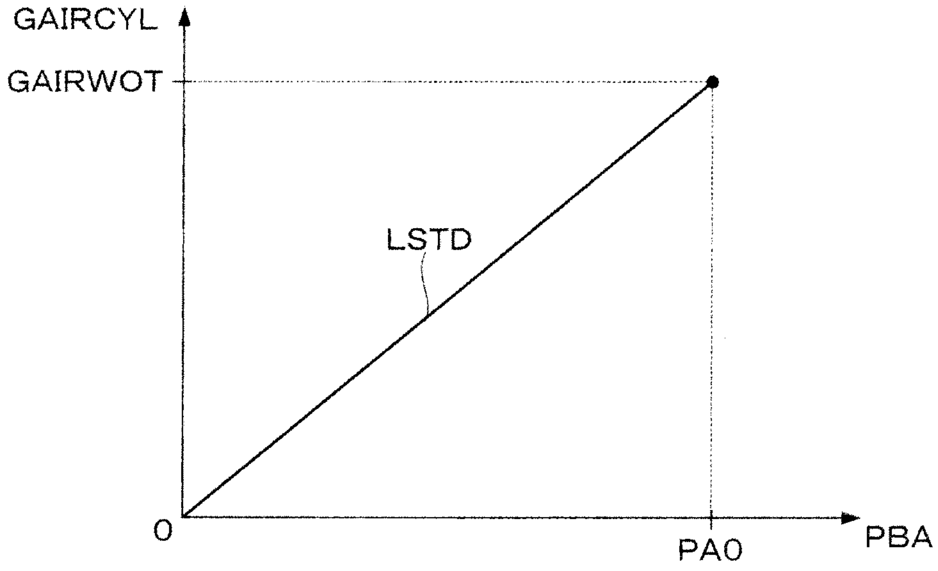
FIG. 11 illustrates another calculation method of a theoretical cylinder intake air amount.

FIG. 11 illustrates another method of calculating the theoretical cylinder intake air amount GAIRSTD, and shows a relationship between the intake pressure PBA and the cylinder intake air amount GAIRCYL in the condition where the engine rotational speed NE is constant. PA0 in FIG. 11 indicates an atmospheric pressure of the reference state (for example, 101.3 kPa (760 mmHg)), and GAIRWOT indicates a detected cylinder intake air amount (hereinafter referred to as "maximum cylinder intake air amount") when the intake pressure PBA is equal to the reference atmospheric pressure PA0 and the actual intake air temperature is equal to the reference temperature TA0 (for example, 25 degrees Centigrade). The maximum cylinder intake air amount GAIRWOT is obtained by applying the intake air flow rate GAIR detected by the intake air flow rate sensor to the equation (9).

If the intake pressure changes, the theoretical cylinder intake air amount moves on the theoretical line LSTD shown in FIG. 11, and the maximum cylinder intake air amount GAIRWOT moves on the theoretical line LSTD if the atmospheric pressure PA changes. Accordingly, the theoretical line LSTD shown in FIG. 11 can be used regardless of changes in the atmospheric pressure PA. Therefore, a basic theoretical cylinder intake air amount GAIRSTDB which is a theoretical cylinder intake air amount in the reference state can be calculated by calculating the maximum cylinder intake air amount GAIRWOT according to the engine rotational speed NE, and applying the maximum cylinder intake air amount GAIRWOT and the detected intake pressure PBA to the following equation (21).

$$GAIRSTDB=GAIRWOT\times PBA/PA0 \qquad (21)$$

Further, by correcting the basic theoretical cylinder intake air amount GAIRSTDB according to the detected intake air temperature TA and engine coolant temperature TW, the theoretical cylinder intake air amount GAIRSTD is obtained. Since an actual intake air temperature deviates from the intake air temperature TA detected by the intake air temperature sensor 9 due to influence of the engine temperature (especially the intake port temperature), it is preferable to also perform the correction according to the engine coolant temperature TW.

Figure 12:
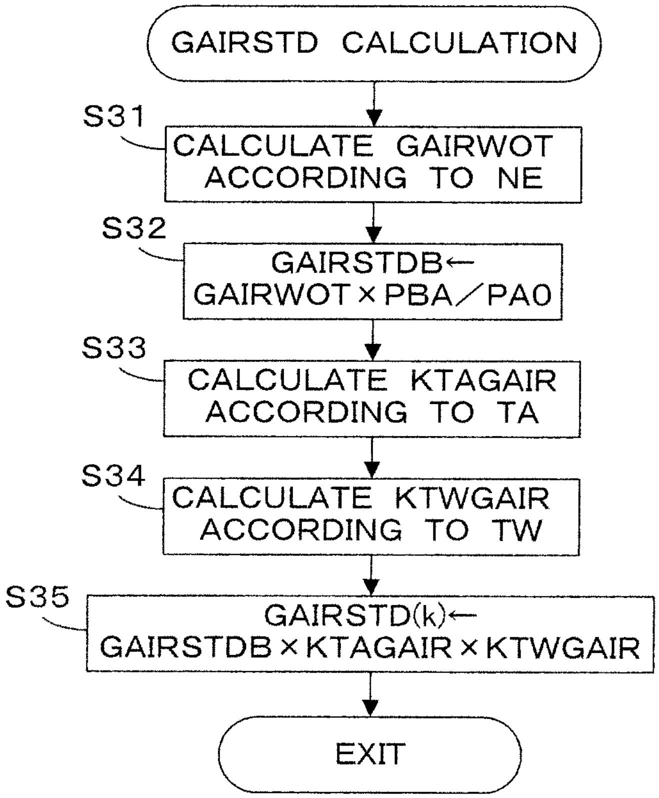
FIG. 12 is a flowchart of a process for calculating the theoretical cylinder intake air amount (GAIRSTD).

FIG. 12 is a flowchart of the process for calculating the theoretical cylinder intake air amount GAIRSTD with the above-described method.

Figure 13:
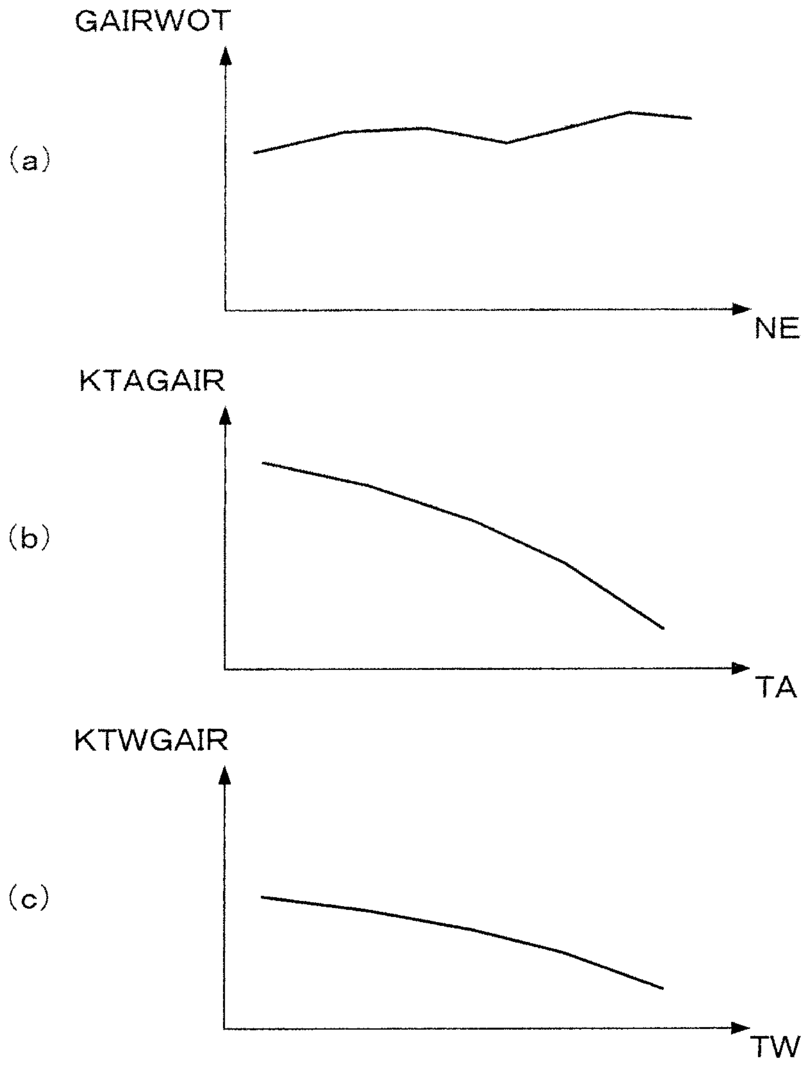
FIG. 13 shows tables referred to in the process of FIG. 12.

In step S31, a GAIRWOT table shown in FIG. 13(*a*) is retrieved according to the engine rotational speed NE, to calculate the maximum cylinder intake air amount GAIRWOT. In step S32 the basic theoretical cylinder intake air amount GAIRSTDB is calculated by the above-described equation (21).

In step S33, a KTAGAIR table shown in FIG. 13(*b*) is retrieved according to the detected intake air temperature TA, to calculate an intake air temperature correction coefficient KTAGAIR. The KTAGAIR table is set so that the intake air temperature correction coefficient KTAGAIR decreases as the intake air temperature TA becomes higher.

In step S34, a KTWGAIR table shown in FIG. 13(*c*) is retrieved according to the detected engine coolant temperature TW, to calculate a coolant temperature correction coefficient KTWGAIR. The KTWGAIR table is set so that the coolant temperature correction coefficient KTWGAIR decreases as the engine coolant temperature TW becomes higher.

In step S35, the theoretical cylinder intake air amount GAIRSTD(k) is calculated by the following equation (22).

$$GAIRSTD(k)=GAIRSTDB\times KTAGAIR\times KTWGAIR \quad (22)$$

According to the process of FIG. 12, calculation accuracy of the theoretical cylinder intake air amount GAIRSTD can be improved with suppressing an increase in the calculation amount, compared with the calculation with the above-described equation (8).

Further, in the above described embodiments, the estimated intake air flow rate HGAIR is calculated using the atmospheric pressure PA detected by the atmospheric pressure sensor 33. Alternatively, the estimated intake air flow rate HGAIR may be calculated using the estimated atmospheric pressure HPA calculated using a well known atmospheric pressure estimation method (for example, refer to the U.S. Pat. No. 6,016,460).

Further in the above described embodiments, the example in which the present invention applied to a gasoline internal combustion engine is shown. The present invention is also applicable to a diesel internal combustion engine. Further, the present invention can also be applied to a watercraft propulsion engine, such as an outboard engine having a vertically extending crankshaft.

DESCRIPTION OF REFERENCE NUMERALS

| | |
|---|---|
| 1 | Internal combustion engine |
| 1a | Cylinder |
| 2 | Intake pipe |
| 3 | Throttle valve |
| 5 | Electronic control unit (theoretical cylinder intake air amount calculating means, volumetric efficiency calculating means, cylinder intake air amount calculating means) |
| 8 | Intake pressure sensor (intake pressure detecting means) |
| 9 | Intake air temperature sensor (intake air temperature detecting means) |
| 13 | Intake air flow rate sensor (intake air flow rate obtaining means) |

The invention claimed is:

1. A cylinder intake air amount calculating apparatus for an internal combustion engine for calculating a current cylinder intake air amount which is an amount of fresh air sucked into a cylinder of said engine, said cylinder intake air amount calculating apparatus being characterized by comprising:

intake air flow rate obtaining means for obtaining an intake air flow rate which is a flow rate of fresh air passing through an intake air passage of said engine;

intake pressure detecting means for detecting an intake pressure of said engine;

intake air temperature detecting means for detecting an intake air temperature which is a temperature of air sucked into said engine;

theoretical cylinder intake air amount calculating means for calculating a theoretical cylinder intake air amount based on the intake pressure and the intake air temperature;

volumetric efficiency calculating means for calculating a volumetric efficiency of said engine by dividing a preceding calculated value of a cylinder intake air amount by the theoretical cylinder intake air amount; and cylinder intake air amount calculating means for calculating the current cylinder intake air amount using the volumetric efficiency, the intake air flow rate, and the preceding calculated value of the cylinder intake air amount, wherein said volumetric efficiency calculating means updates the volumetric efficiency at least once in one stroke period using the cylinder intake air amount calculated by said cylinder intake air amount calculating means as the preceding calculated value, and said cylinder intake air amount calculating means updates the cylinder intake air amount at least once in one stroke period using the updated volumetric efficiency.

2. The cylinder intake air amount calculating apparatus according to claim 1, wherein said intake air flow rate obtaining means detects the intake air flow rate using an intake air flow rate sensor.

3. The cylinder intake air amount calculating apparatus according to claim 1, wherein said intake air flow rate obtaining means estimates the intake air flow rate based on an opening of a throttle valve of said engine and the intake pressure.

4. The cylinder intake air amount calculating apparatus according to claim 1, wherein said volumetric efficiency calculating means and said cylinder intake air amount calculating means respectively update the volumetric efficiency and the current cylinder intake air amount by a predetermined number of times.

5. The cylinder intake air amount calculating apparatus according to claim 1, wherein said volumetric efficiency calculating means and said cylinder intake air amount calculating means respectively update the volumetric efficiency and the current cylinder intake air amount until a difference between a preceding value and an updated value of the volumetric efficiency reaches a value less than a first predetermined amount, or until a difference between a preceding value and an updated value of the current cylinder intake air amount reaches a value less than a second predetermined amount.

6. The cylinder intake air amount calculating apparatus according to claim 1, wherein said volumetric efficiency calculating means and said cylinder intake air amount calculating means respectively use the theoretical cylinder intake air amount as the preceding calculated value of the cylinder intake air amount, immediately after start of said engine.

7. A cylinder intake air amount calculating method for an internal combustion engine for calculating a current cylinder intake air amount which is an amount of fresh air sucked into a cylinder of said engine, said cylinder intake air amount calculating method being characterized by comprising the steps of:

a) obtaining, by a cylinder intake air amount calculating apparatus, an intake air flow rate which is a flow rate of fresh air passing through an intake air passage of said engine;

b) detecting, by the cylinder intake air amount calculating apparatus, an intake pressure of said engine;

c) detecting, by the cylinder intake air amount calculating apparatus, an intake air temperature which is a temperature of air sucked into said engine;

d) calculating, by the cylinder intake air amount calculating apparatus, a theoretical cylinder intake air amount based on the intake pressure and the intake air temperature;

e) calculating, by the cylinder intake air amount calculating apparatus, a volumetric efficiency of said engine by dividing a preceding calculated value of the cylinder intake air amount by the theoretical cylinder intake air amount; and f) calculating, by the cylinder intake air amount calculating apparatus, the current cylinder intake air amount using the volumetric efficiency, the intake air flow rate, and the preceding calculated value of a cylinder intake air amount, wherein said step e) includes the step of updating the volumetric efficiency at least once in one stroke period using the cylinder intake air amount calculated in said step f) as the preceding calculated value, and said step f) includes the step of updating the cylinder intake air amount at least once in one stroke period using the updated volumetric efficiency.

8. The cylinder intake air amount calculating method according to claim 7, wherein the intake air flow rate is detected using an intake air flow rate sensor in said step a).

9. The cylinder intake air amount calculating method according to claim 7, wherein the intake air flow rate is estimated based on an opening of a throttle valve of said engine and the intake pressure in said step a).

10. The cylinder intake air amount calculating method according to claim 7, wherein the volumetric efficiency and the update of the current cylinder intake air amount are respectively updated by a predetermined number of times.

11. The cylinder intake air amount calculating method according claim 7, wherein the volumetric efficiency and the current cylinder intake air amount are respectively updated until a difference between a preceding value and an updated value of the volumetric efficiency reaches a value less than a first predetermined amount, or until a difference between a preceding value and an updated value of the current cylinder intake air amount reaches a value less than a second predetermined amount.

12. The cylinder intake air amount calculating method according to claim 7, wherein the theoretical cylinder intake air amount is used as the preceding calculated value of the cylinder intake air amount, immediately after start of said engine.

* * * * *